United States Patent
Diaz

(10) Patent No.: US 7,072,455 B2
(45) Date of Patent: Jul. 4, 2006

(54) ONLINE METHOD AND APPARATUS FOR THE INTERACTIVE CREATION OF CUSTOM PREPAID VIRTUAL CALLING CARDS

(75) Inventor: Luis J. Diaz, Green Brook, NJ (US)

(73) Assignee: IDT Corporation, Newark, NJ (US)

( * ) Notice: Subject to any disclaimer, the term of this patent is extended or adjusted under 35 U.S.C. 154(b) by 0 days.

(21) Appl. No.: 10/237,257

(22) Filed: Sep. 6, 2002

(65) Prior Publication Data

US 2004/0047459 A1    Mar. 11, 2004

(51) Int. Cl.
*H04M 15/00* (2006.01)
*H04M 17/00* (2006.01)

(52) U.S. Cl. .............. 379/144.01; 379/114.5; 379/114.2; 379/144.08; 455/408

(58) Field of Classification Search ........... 379/114.01, 379/114.15, 114.16, 114.17, 114.18, 114.19, 379/114.2, 114.05, 144.01, 144.08; 455/405, 455/406, 408; 705/35, 40, 39; 235/380, 235/381
See application file for complete search history.

(56) References Cited

U.S. PATENT DOCUMENTS

| | | | | |
|---|---|---|---|---|
| 5,511,114 A | | 4/1996 | Stimson et al. ............. 379/114 |
| 5,513,117 A | * | 4/1996 | Small ......................... 700/233 |
| 5,923,734 A | * | 7/1999 | Taskett .................. 379/114.18 |
| 5,991,381 A | * | 11/1999 | Bouanaka et al. ..... 379/115.01 |
| 6,202,155 B1 | * | 3/2001 | Tushie et al. ............... 713/200 |
| 6,256,614 B1 | * | 7/2001 | Wecker et al. ................ 705/14 |
| 6,370,514 B1 | * | 4/2002 | Messner ...................... 705/14 |
| 6,516,324 B1 | | 2/2003 | Jones et al. ............. 707/104.1 |
| 6,526,130 B1 | * | 2/2003 | Paschini .................. 379/93.12 |
| 6,628,766 B1 | * | 9/2003 | Hollis et al. ............. 379/114.2 |
| 6,771,640 B1 | * | 8/2004 | Karamchedu et al. ...... 370/352 |
| 2001/0047334 A1 | * | 11/2001 | Nappe et al. ................. 705/41 |
| 2002/0046255 A1 | * | 4/2002 | Moore et al. ............... 709/218 |
| 2002/0099607 A1 | * | 7/2002 | Sosa et al. .................... 705/14 |
| 2003/0050043 A1 | * | 3/2003 | Ohrstrom et al. .......... 455/406 |
| 2004/0042599 A1 | * | 3/2004 | Zaner et al. ........... 379/144.01 |
| 2004/0128237 A1 | * | 7/2004 | Obe ............................ 705/39 |
| 2005/0121514 A1 | * | 6/2005 | Hovsepian .................. 235/382 |

* cited by examiner

*Primary Examiner*—Binh K. Tieu
(74) *Attorney, Agent, or Firm*—Ohlandt, Greeley, Ruggiero & Perle, L.L.P.

(57) ABSTRACT

A prepaid virtual calling card, specifically for providing users (consumers and business affiliates) with an on-line method and apparatus to create custom prepaid calling cards for immediate use and distribution, wherein the prepaid virtual calling card is created by: connecting a user via a communications network to at least one server; presenting the user with an applications supplied by the server for the issuance of the virtual calling card; submitting the application to the server; and issuing the virtual calling card.

11 Claims, 2 Drawing Sheets

ONLINE METHOD AND APPARATUS FOR THE INTERACTIVE CREATION OF CUSTOM PREPAID VIRTUAL CALLING CARDS

BACKGROUND OF THE INVENTION

1. Field of the Invention

The present invention relates to the creation of prepaid telephone calling cards, and, in particular, to a method and apparatus for the interactive creation of custom prepaid telephone calling cards.

2. Discussion of the Background Art

Competition in the long distance carrier market has led to a proliferation of new products and marketing techniques for selling long distance time. One innovation is the prepaid telephone calling card which provides a user with a certain amount of long distance time. The long distance service may include various national or international regions.

A prepaid calling card service provider typically purchases long distance capacity in volume, for example by leasing a number of lines, and in turn provides long distance calling services to businesses and individuals through the use of prepaid calling cards.

A prepaid calling card user usually purchases a specific number of minutes or for a specific dollar amount of long distance service, paid for in advance. The user is typically given a card on which is imprinted an access telephone number and an account number. Upon calling the access number, the user is prompted to enter the account number and the destination number they wish to call. A system checks the account, and if a positive balance remains, the user is connected to their destination number. During the course of the call, the account balance is deducted as the call progresses. Calling privileges are discontinued when the balance reaches zero.

Current distribution of telephone cards has typically been accomplished through retail outlets, such as gas stations, grocery stores, convenience stores and to some degree through manually operated vending machines. The conventional prepaid card distribution channels usually consist of a hierarchical network of manufacturers, distributors and sub-distributors that physically manufacture and place hard copy cards at the retail distribution outlets.

One of the limitations of conventional prepaid calling card commerce is that existing marketing channels and distribution methods are expressly tied to predefined trademarks and designs. Prepaid calling card providers strive to make their cards immediately recognizable and attempt to create and maintain their customer base through brand identification. Another limitation of presently available prepaid calling cards is that they are targeted to a single user. A prepaid calling card can realistically be used only by the person in possession of the physical card. As a practical matter, joint use of a card by multiple persons is not practical. Another limitation is that prepaid calling cards are usually sold in predefined denominations, for example, $5, $10, $20, etc. A user is restricted to purchasing a prepaid card in the available denominations which may be inconvenient depending on a users calling habits. In addition, the physical layout of the cards and related packaging is usually predefined, based on the desire for brand identification mentioned above. This limits the amount of space available for targeted advertising, collateral product sales, and other marketing opportunities, and also limits and may even prohibit customisation of the prepaid calling card itself.

The Internet has become an important advertising, distribution, and service channel for many businesses. For example, a web site on the Internet not only provides an enterprise with a vehicle for advertising its products and for providing customer service, but may also provide a distribution channel for the products. As such, a web site provides a powerful channel of commerce, accessible to anyone in the world with the appropriate equipment, without time or geographical restrictions. A web site further offers an opportunity to provide additional presentations and marketing situations to a much larger audience of customers and potential customers than more traditional marketing and distribution techniques.

The present invention described below overcomes the above limitations by: (a) creating an alternate, less expensive, method of distribution, (b) eliminating the need to create and maintain expensive trademarks, (c) reducing printing costs, (d) providing users with the ability to instantly order and use the phone cards, (e) eliminating the denomination limitations on cards, (f) supporting shared use of calling cards, (g) providing for enhanced marketing and cross selling opportunities without the physical space limitations of calling cards, (h) allowing users to created personal cards with their "own brand" or messages, and (i) providing for multiple means of incorporating calling card profiles into other physical or electronic personal communication devices to facilitate increased use of the same.

SUMMARY OF THE INVENTION

A method for creating a prepaid virtual calling card comprising: connecting a user via a communications network to at least one server; presenting the user with an applications supplied by the server for the issuance of the virtual calling card; submitting the application to the server; and issuing the virtual calling card.

The server preferably comprises a staging server and a production server, wherein the staging server develops the application and the production server stores the application. The application is either a web site or web page.

The communications network is at least one selected from the group consisting of: a public switched telephone network, a wireless network, a wired network, and a virtual private network.

The virtual calling card is preferably a customized calling card, wherein the customization of the virtual calling card is selected from the group consisting of: formats, custom designs and distribution lists.

The format is preferably at least one selected from the group consisting of: custom access number and account number; custom email; custom audio; and custom hard copy. The custom email format comprises: presenting the user with a set of tools for creating a custom email, the tools are selected from the group consisting of: a personalized message generator; a marketing message generator; a graphical image generator; an animated message generator; a video generator; an audio track generator; and an email message which is capable of conveying an access number and account.

The method further comprises replenishing the dollar usage limit available to the user.

The present invention also includes a system for creating a prepaid virtual calling card which comprises: a communications network for connecting a user and a server; a display means for displaying an application for a prepaid virtual calling card; means for submitting the application; and a means for issuing the application.

DETAILED DESCRIPTION OF THE INVENTION

Figure 1:
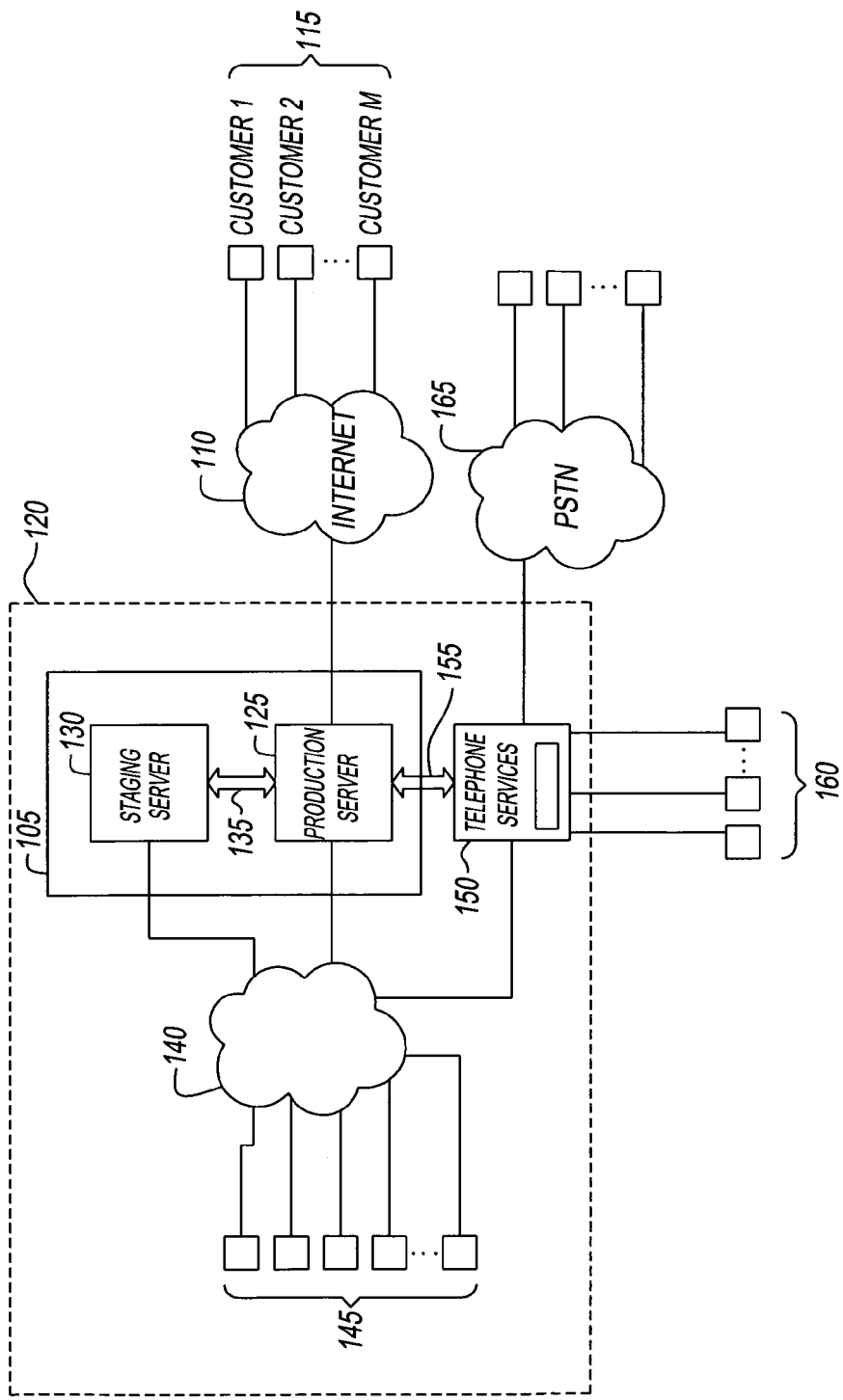
FIG. 1 is a block diagram of a system for hosting a web site and providing telephone services in accordance with the teachings of the invention.

A prepaid calling card, specifically for providing users (consumers and business affiliates) with an on-line method and apparatus to create custom prepaid calling cards for immediate use and distribution.

The present invention provides a mechanism that addresses the above-identified limitations. The present invention facilitates the purchase of prepaid calling cards by providing a web site that allows users to purchase prepaid cards at any time, and from anywhere in the world. In addition, the present invention allows a user to create a prepaid calling card by selecting from a number of pre-defined designs, and more significantly, by allowing a user to customize the prepaid calling card in a variety of ways. Another feature of the present invention includes allowing the user to select the denomination of the prepaid card. Furthermore, the present invention allows a user to select the physical realization, or format, of the card (i.e., an actual card, an electronic card, a message, etc.). Still further, the invention provides for distribution of the card to a number of users and to a variety of devices.

Other benefits of the present invention are as follows: (1) increases a company's sales and profit margin on its calling card sales; (2) conducts targeted advertising and marketing campaigns directed at specific groups of users based on geographic profiles stored on the company's web servers; (3) creates an on-line distribution network with strategic business partners that already cater to specific target markets (for example, this could be a custom service available via travel sites (e.g., Expedia, Travelocity, Amazon.com, IDT web sites), college web sites, foreign language sites and web sites targeting particular user groups, e.g., demographic groups, ethnic groups, e.g. members of the Hispanic community, and other key users with particular attributes and affiliations); (4) appeals to customer needs and wants by allowing them to create highly customizable phone cards, with variable parameters (e.g., graphics, language, dollar amount, special offers, promotions); (5) provides customers with choice of methods to store prepaid calling card parameters, for instance, at the end of the card creation process the customer will be able to print a card, send the profile to a remote wireless device (e.g., a PDA or mobile phone), save the profile to disk, share the card with other users via e-mail, etc.); and (6) provides an easy to use method of creating a competitive advantage in the marketplace.

After selecting either option, the system will prompt the user for basic login information. After this, the system would invoke a secondary interface that will walk the user through the card creation process. The user would select language, origin country, destination country, dollar value, predefined look (for "Buy A Card") or a custom image (for "Make A Card" or "Private Label Card"), other users (if any) that are receive electronic copies of the virtual phone cards for shared usage, and the option to select alternate methods of creating the virtual phone cards. This can include, but is not limited to, printing the cards, e-mailing the cards, sending the card profiles to remote personal devices, e.g. PDAs and mobile phones, storing the card profiles for later use, having the card gift wrapped and shipped to designate recipients with a special message (e.g. happy birthday, get well soon, etc), or having the company generate high-quality plastic card based on the user profile. Irrespective of the mode of delivery selected, the card generated by the system would be immediately usable. Once the user completes the ordering process, the profile would be stored on a web server for use in later marketing and advertising effort. The system would track usage and renewal would be accomplished on-line by selecting the renewal option and indicating the dollar amount of the renewal, or the renewal could be automatic. The information also could be made available to strategic business partners for joint marketing and promotional campaigns.

FIG. 1 shows an overview of a system 100 suitable for practicing the invention disclosed herein. Server 105 is coupled to a global data communications network, for example, the Internet 110. A plurality of customers 115, (customer 1 through customer n) are also coupled to the Internet 110. Customers 115 communicate bi-directionally through the Internet 110 with server 105, and with other devices coupled to the Internet. Customers 115 and server 105 communicate preferably by exchanging data packets using a TCP/IP protocol. Other message and data transport mechanisms may also be employed.

While one server 105 is shown, those skilled in the art will recognize that the server may represent a plurality of servers, and that these servers can be sited at one location, or they may be widely distributed and remotely sited. For example, a plurality of distributed servers 105 can be used for servicing customers 115 in different geographic locations, such as North America, South America, Europe, Africa, Japan, etc. or, alternatively, a single server 105 can be used for servicing all customers 115. Server 105 could be located at an enterprise location or site 120, which could be an office of a service provider. Server 105 preferably also includes production server 125 and staging server 130. Production server 125 stores data representing web sites, web pages, screens and page templates, as well as other data as described below, for transmission to customers 115. Production server 125 also provides an interface and communication to customers 115. The staging server 130 provides an environment for web site development where new web sites, web pages, and updates or revisions to current web sites and pages may be developed and tested. The production server 125 and the staging server 130 may communicate directly through link 135, or may communicate over internal network 140 which may also provide communication with other computing devices 145 at the enterprise site 120 or other sites (not shown).

The global data communications network, in this example the Internet 110, may include any network suitable for communication with customers 115, for example, the Public Switched Telephone Network (PSTN), a wireless network, a wired network, a virtual private network (VPN) etc. Customers 115 may communicate with the server 105 using any suitable protocol, including X.25, ATM, TCP/IP, etc.

Customers 115 are assumed, for the purposes of this invention, to include a capability, such as a keyboard, mouse, or trackball, for navigating through a hierarchy of related web sites, web pages and screens that are presented to customers 115 from server 105, via the Internet 110.

In the presently preferred embodiment of this invention the business conducted at the enterprise location 120 is related to providing long distance telephone services, and includes a telephone card system 150 for providing those services in conjunction with prepaid calling cards. Telephone system 150 may communicate with production server 135 through link 155, or may communicate through internal network 140.

In the preferred embodiment, the server 105 stores a plurality of web pages and appropriate software for implementing a web site directed in particular to providing a customer 115 with an interface for selecting, customizing, purchasing and delivering prepaid calling cards.

Figure 2:
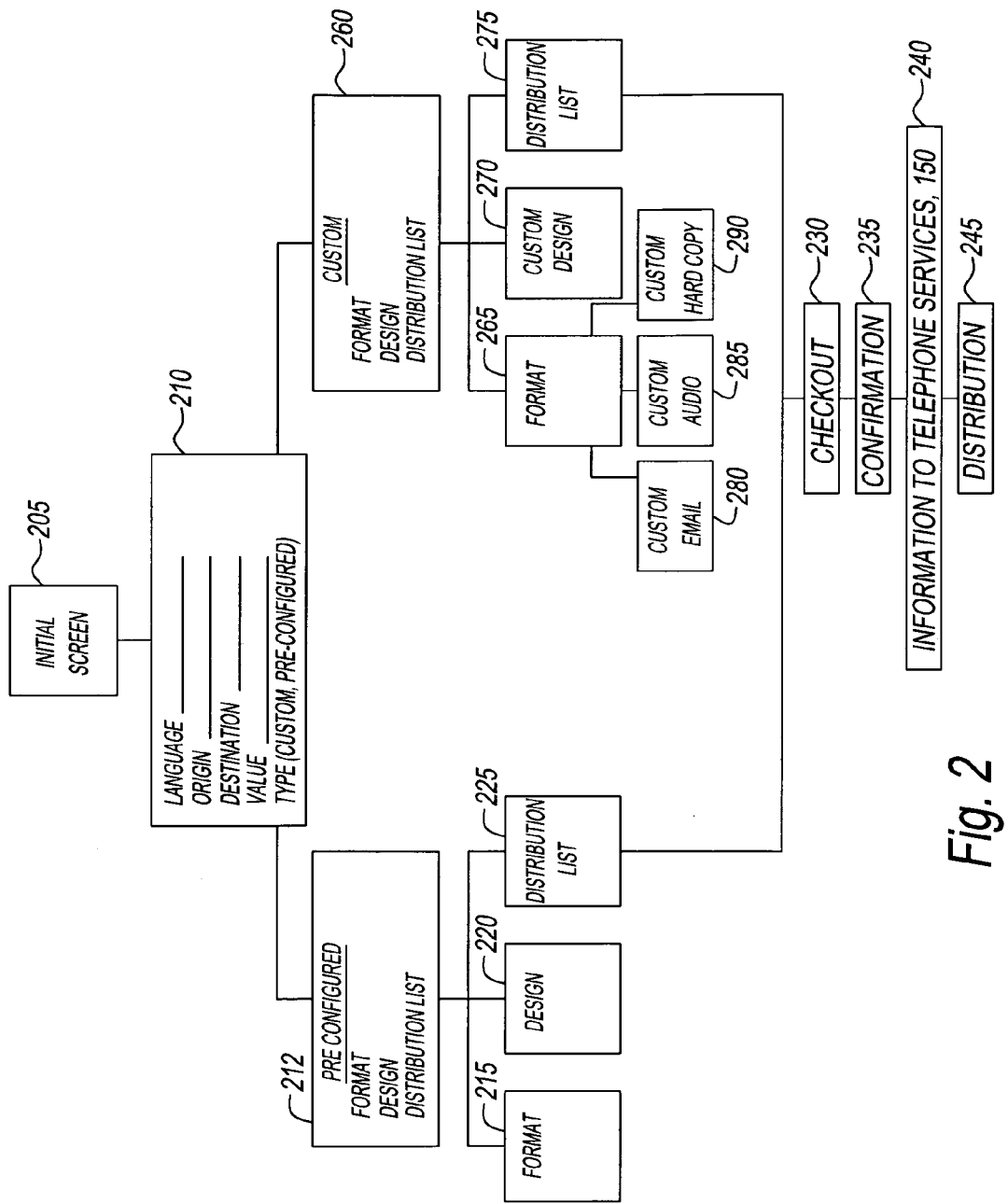
FIG. 2 shows an example, in schematic form, of web pages and screens, organized in a hierarchical arrangement.

As shown in the example of FIG. 2, the web site may be organized in a hierarchical manner and allows customer 115 to navigate through a selection of screens in order to select, optionally customize and purchase a prepaid calling card. Upon accessing the web site, customer 115 is presented with an initial screen 205 which is typically the home page of the web site. Initial screen 205 may provide customer 115 with introductory information screen 210, links to FAQ's, customer service functions, and other functions as appropriate. Introductory screen 210 may request information from customer 115 and may also gather information about customer 115 from the customer's computer. Introductory screen 210 preferably provides customer 115 with an option to select a pre-configured prepaid calling card or a customized prepaid calling card.

If customer 115 selects a pre-configured prepaid calling card, a screen 212 is presented that allows customer 115 to select various options for the pre-configured card. Screen 212 may include options for the format 215, design 220, distribution list 225, and denomination amount of the card 230. The various formats 215 customer 115 may select from may include email, audio, text based, and hard copy or premium hard copy with a gift wrapped option.

Upon selection of the email format, customer 115 would be presented with a number of pre-configured email designs from which to choose. Upon selection of a particular email design, customer 115 would be prompted to provide a distribution list for the email, that is a list of recipients to whom the prepaid calling card would be sent. The distribution list may include one or more destinations such as personal computers, mobile telephones, PDA's, electronic organizers, or any other appliance or device capable of receiving email.

In addition, the distribution list may also include one or more conventional postal addresses. It is contemplated that for a conventional postal address, the server 105 (FIG. 1) may include some type of printing facility and the enterprise 120 would provide a conventional mailing mechanism.

After providing the distribution list, customer 115 may then provide the denomination of the prepaid calling card in either minutes of service or a dollar amount. The denomination may include any number of minutes or any dollar amount customer 115 desires. After choosing a denomination, customer 115 may then be presented with a checkout procedure where the total purchase is calculated and customer 115 provides payment for the purchase. The choices made by customer 115 and the checkout procedure may be controlled by conventionally available web based "shopping basket" technology, or may be controlled by other means.

Upon checkout and payment, customer 115 is provided with a confirmation, details of the transaction are sent to telephone system 150, and the prepaid calling card in email format is distributed to the destinations on the distribution list, allowing multiple users to utilize the prepaid calling card.

In the event that customer 115 chooses an audio format, customer 115 may be invited to select from a number of pre-recorded messages that would include an access number and an account number for allowing the recipient to use the prepaid calling card services. After selecting a particular audio message, customer 115 would be prompted to provide a distribution list 225 as mentioned above. The distribution list 225 may include destinations that are capable of receiving an audio message, such as pagers, mobile and stationary telephones, personal computers, PDA's, electronic organizers, or any other appliance or device capable of receiving and conveying an audio message to a user. After designating a distribution list 225, customer 115 may then be presented with a checkout and payment, customer 115 may be provided with a confirmation 235, details of the transaction are sent to telephone system 150 as shown in block 240, and the audio prepaid calling card is distributed to the destinations on the distribution list 225 as shown in block 245.

Selection of the hard copy and premium hard copy options would lead customer 115 through a set of operations similar to those described above. Customer 115 selects from a number of hard copy prepaid calling card designs. A premium hard copy option may be provided that allows customer 115 to select from a variety of high quality card finishing options, for example, laminated, plastic, special colours, cards designed for long term use, to commemorate certain events, etc. Customer 115 may also be provided with a gift wrapping option for the hard copy or premium hard copy card. After completing the selections, customer 115 provides a distribution list 225 of recipients that includes destinations suitable for receiving a hard copy card, for example, a postal address. After checkout and payment 230, the hard copy prepaid calling card is printed and sent to those on the distribution list 225 (block 245).

Returning now to the introductory screen 210, customer 115 also has an option to selected a customized prepaid calling card. Upon selection of the customized option, customer 115 is presented with a screen 260 providing options similar to those for a pre-configured prepaid calling card, including options for format 265, custom design 270, and distribution list 275. The various formats 265 customer 115 may select from may include any format capable of conveying at least an access number and account number for using the prepaid calling card services. Customer 115 is a least provided with format selections including custom email 280, custom audio 285, and custom hard copy or custom premium hard copy 290 with a gift wrapped option.

Upon selection of the custom email format 280, customer 115 is presented with a set of tools for creating a custom email that may include a personalized message, for example, "Get Well Soon", "Happy Birthday", a marketing message, any number and types of graphical presentations, an animated message, a video, an audio track, or any other type of email message capable of conveying an access number and account, allowing the recipient to utilize prepaid calling card services.

The custom audio option 285 allows customer 115 to provide a custom audio message to the recipient. Customer 115 may provide a previously recorded audio file or may be prompted to record a custom audio message as part of the card creation process.

Selection of the custom hard copy and custom premium hard copy options 290 lead customer 115 through a set of operations similar to those described above for the custom email selection 280. Customer 115 is presented with a set of tools for creating any number and types of hard copy graphical presentations, suitable for conveying an access number and account to a recipient. The custom premium hard copy option may provide customer 115 with a variety of high quality card finishing selections as mentioned above, with respect to the pre-configured cards.

After completing the selections, customer 115 provides a distribution list 275 of recipients that includes destinations suitable for receiving the type of custom card format specified. After choosing a distribution list 275, customer 115 may then be presented with checkout and payment procedures 230 as described above, where the total purchase is calculated and customer 115 provides payment for the purchase. After checkout procedure 230, customer 115 is provided with a confirmation 235, details of the transaction are sent to telephone system 150 (Block 240), and the prepaid calling card in the selected format is distributed to distribution list 275 (Block 245).

Returning now to FIG. 1, upon receiving the pre-configured or custom prepaid calling card, a recipient 160 utilizes the calling card services by calling the access number. The telephone services system 155 receives the call and prompts recipient 160 to enter the account code or number and the number the recipient 160 intends to call. Upon verification that the account code is valid, and that a currency value or calling time remains in the account, the telephone services system 150 allows the recipient 160 to access the telephone network, in this example shown as the PSTN 165. When the calling time or value of the account approaches zero, telephone services system 150 terminates the use of the account. The account may be recharged or replenished as the recipient 160 desires.

While the embodiments above are disclosed in the context of a web site having a series of web pages and screens, it should be understood that server 105 may provide customer 115 with an interface for selecting, customizing, purchasing and delivering prepaid calling cards that may embody any number and different types of technology suitable for practicing the invention. For example, server 105 may provide customer 115 with a text based interface through a conventional dial up connection, or an audio based interface using a POTS type telephone.

It can thus be appreciated that while the invention has been particularly shown and described with respect to preferred embodiments thereof, it will be understood by those skilled in the art that changes in form and details may be made therein without departing from the scope and spirit of the invention.

What is claimed is:

1. A method for creating a prepaid virtual calling card comprising:
    connecting a user via a communications network to at least one server;
    presenting said user with an application supplied by said at least one server for the issuance of said prepaid virtual calling card;
    selecting a pre-configured calling card or a custom calling card from said application;
    submitting said application to said at least one server; and
    issuing said prepaid virtual calling card.

2. The method according to claim 1, wherein said at least one server comprises a staging server and a production server.

3. The method according to claim 2, wherein said staging server develops said application.

4. The method according to claim 2, wherein said production server stores said application.

5. The method according to claim 1, wherein said application is either a web site or web page.

6. The method according to claim 1, wherein said communications network is at least one selected from the group consisting of: a public switched telephone network, a wireless network, a wired network, and a virtual private network.

7. The method according to claim 1, wherein said prepaid virtual calling card is said customized calling card.

8. The method according to claim 7, wherein the customization of said prepaid virtual calling card is selected from the group consisting of: formats, custom designs, and distribution lists.

9. The method according to claim 8, wherein said format is at least one selected from the group consisting of: custom access number and account number, custom email, custom audio, and custom hard copy.

10. A method for creating a prepaid calling card, comprising:
    connecting a user to an application via a communications network;
    allowing the user to select from a plurality of options for creating the prepaid calling card from said application, said plurality of options for creating the prepaid calling card comprising either a pre-configured calling card or a custom calling card;
    allowing the user to select from a plurality of options for issuing the prepaid calling card from said application, said plurality of options for issuing the prepaid calling card comprising two or more options selected from the group consisting of printing a card, sending a card profile to a remote wireless device, saving said card profile to a disk, and sending said card profile via e-mail;
    submitting said application to said server; and
    issuing the prepaid calling card.

11. The method according to claim 10, wherein said communications network is selected from the group consisting of a public switched telephone network, a wireless network, a wired network, and a virtual private network.

* * * * *